March 9, 1954     J. C. BUCKLEY     2,671,625
PIPE HANGER
Filed Feb. 3, 1949
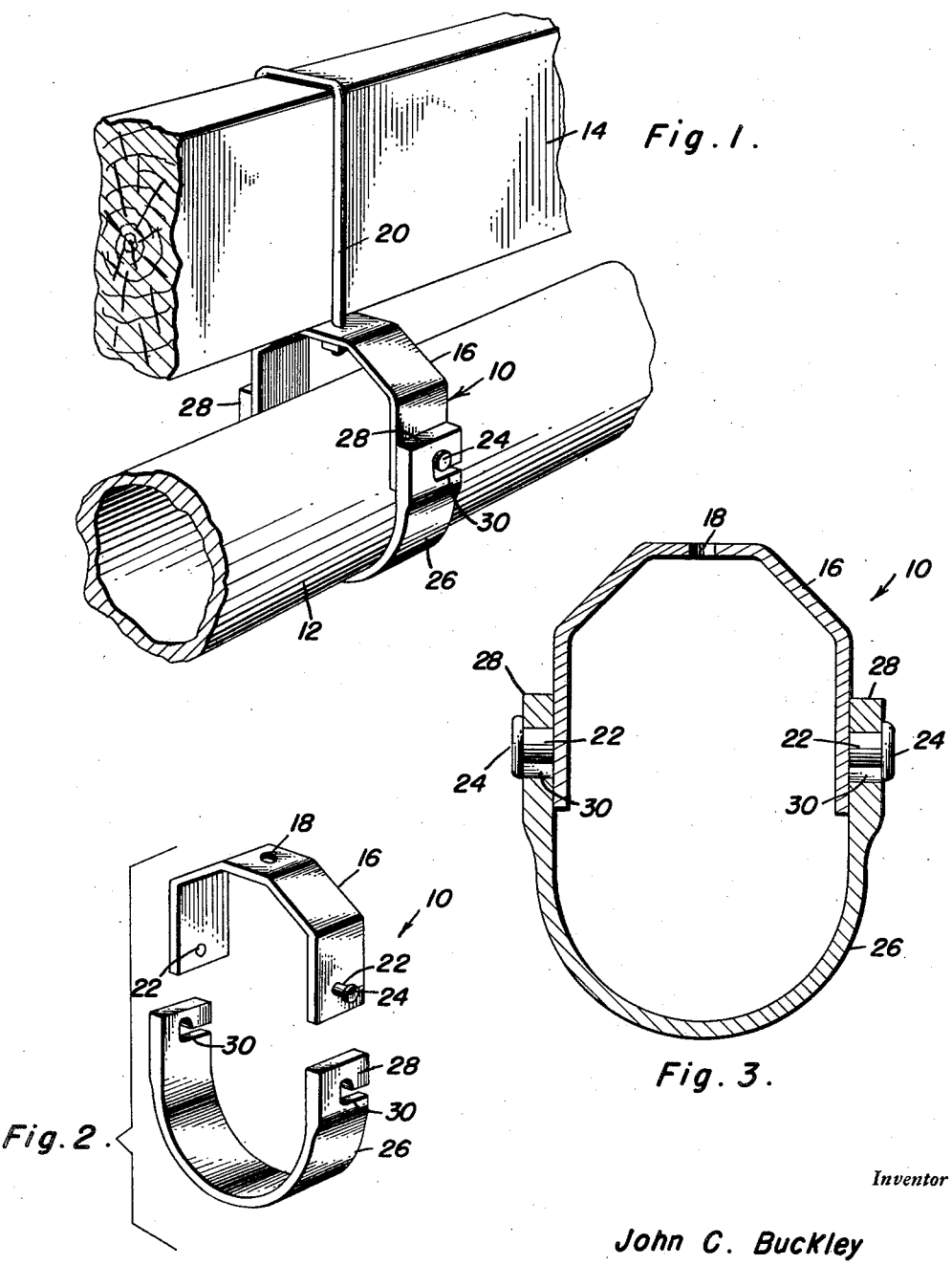
Inventor
John C. Buckley
By Clarence A. O'Brien
and Harvey B. Jacobson
Attorneys

UNITED STATES PATENT OFFICE 2,671,625

PIPE HANGER

John C. Buckley, Holyoke, Mass.

Application February 3, 1949, Serial No. 74,312

1 Claim. (Cl. 248—58)

This invention relates to new and useful improvements and structural refinements in hangers for pipes, particularly pipes of large diameters, and the principal object of the invention is to facilitate convenient and expeditious hanging of such pipes as well as firm and secure supporting thereof after they are hung.

This object is achieved by the provision of the instant hanger which consists of two substantially U-shaped members, one of these members being adapted to be suspended from suitable supporting structure, while the other functions as a cradle for the pipe, an important feature of the invention involving the provision of means for separably connecting the two members together after the pipe is applied thereto.

Some of the advantages of the invention lie in its simplicity of construction, in its adaptability for installation in various locations, even poorly accessible locations, and in its adaptability to economical manufacture.

With the above more important objects and features in view and such other objects and features as may become apparent as this specification proceeds, the invention consists essentially in the construction and arrangement of parts as shown in the accompanying drawings, in which:

Figure 1 is a perspective view showing a pipe supported by the invention,

Figure 2 is a group perspective view of the two components of the invention, and Figure 3 is a vertical cross-sectional view of the two components connected together.

Like characters of reference are employed to designate like parts in the specification and throughout the several views.

Referring now to the accompanying drawings in detail, the invention consists of a pipe hanger designated generally by the reference character 10, the same being particularly adapted for suspending large pipes 12 from suitable supporting structure, such as, for example, from a beam 14.

The hanger 10 embodies in its construction an inverted, substantially U-shape member 16 which is provided in the bight portion thereof with a suitable aperture 18 to receive a hook 20 whereby the member 16 is suspended from the beam 14, it being understood that these suspension means do not constitute a component of the invention and are shown in the drawing for illustrative purposes only. In other words, the member 16 may be suspended from or secured to the beam 14 in any desired conventional manner.

A pair of axially aligned pins 22 are secured by welding or the like to the lower, free end portions of the member 16 and are equipped with enlarged heads 24, it being understood that the pins 22 project outwardly to both sides of the member 16, as is best shown in Figure 3.

A substantially U-shaped strap 26 constitutes what may be called a cradle for the pipe 12 and has thickened end portions 28 which are formed with a pair of transversely aligned bayonet slots 30. It is to be noted that the slots 30 are open at the same longitudinal edge of the strap 26 and extend horizontally to a point intermediate the width of the strap, after which the "bays" of the slots extend upwardly, as is best shown in Figure 2.

The slots 30 are adapted to receive therein the aforementioned pins 22, so that when the invention is placed in use, the member 16 is suspended from the beam 14 and the pipe 12 is positioned between or below the side pieces of the member 16. The cradle 26 is then applied to the pipe 12 and the pins 22 are engaged with the slots 30, whereby the cradle 26 is firmly yet separably connected to the member 16 and the pipe 12 is securely hung.

Needless to say, the heads 24 of the pins 22 prevent these pins from becoming disengaged laterally from the slots 30, as will be clearly apparent.

It is believed that the advantages and use of the invention will be readily understood from the foregoing disclosure, and accordingly, further description thereof at this point is deemed unnecessary.

Having described the invention, what is claimed as new is:

A pipe hanger comprising a rigid, inverted substantially U-shaped member, means for suspending said member by its bight portion from a supporting structure, a substantially U-shaped strap forming a pipe cradle and provided in each of the leg portions thereof with an open-ended bayonet slot, said slot comprising an open-end portion extending at right angles to the principal axis of the leg portion of said U-shaped strap and having a connecting closed-end portion extending along an axis transversely of said open-end portion and towards the outer extremity of said leg portion, and an outwardly projecting pin provided on each end portion of said inverted U-shaped member, each of said pins terminating at its outer end in an enlarged head, said pins being removably interlocked to the end portions of said inverted U-shaped member.

JOHN C. BUCKLEY.

(References on following page)

References Cited in the file of this patent

UNITED STATES PATENTS

| Number | Name | Date |
|---|---|---|
| 155,750 | Pollock et al. | Oct. 6, 1874 |
| 624,484 | Haskell | May 9, 1899 |
| 629,684 | Hildebrandt et al. | July 25, 1899 |
| 649,270 | Collins | May 8, 1900 |
| 856,099 | Peirce | June 4, 1907 |
| 940,555 | Read | Nov. 16, 1909 |
| 1,209,286 | Goodwin | Dec. 19, 1916 |
| 1,444,569 | Starkweather | Feb. 6, 1923 |
| 1,450,640 | Norman | Apr. 3, 1923 |
| 1,718,912 | Wright | June 25, 1929 |
| 2,014,563 | Halliburton | Sept. 17, 1935 |
| 2,466,247 | Sand | Apr. 5, 1949 |

FOREIGN PATENTS

| Number | Country | Date |
|---|---|---|
| 110.380 | Sweden | of 1944 |
| 7,239 | Great Britain | of 1885 |